(12) United States Patent
Fodor et al.

(10) Patent No.: US 9,706,589 B2
(45) Date of Patent: Jul. 11, 2017

(54) NETWORK NODES, DEVICES AND METHODS THEREIN FOR ENABLING DEVICE TO DEVICE COMMUNICATION

(71) Applicant: Telefonaktiebolaget L M Ericsson (publ), Stockholm (SE)

(72) Inventors: Gabor Fodor, Hässelby (SE); Erik Dahlman, Stockholm (SE); Göran N. Klang, Enskede (SE); Stefan Parkvall, Bromma (SE); Leif Wilhelmsson, Dalby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 205 days.

(21) Appl. No.: 14/428,032

(22) PCT Filed: Sep. 18, 2012

(86) PCT No.: PCT/SE2012/050987
§ 371 (c)(1),
(2) Date: Mar. 13, 2015

(87) PCT Pub. No.: WO2014/046578
PCT Pub. Date: Mar. 27, 2014

(65) Prior Publication Data
US 2015/0312952 A1   Oct. 29, 2015

(51) Int. Cl.
*H04W 4/00* (2009.01)
*H04W 76/02* (2009.01)
(Continued)

(52) U.S. Cl.
CPC ......... *H04W 76/023* (2013.01); *H04W 4/005* (2013.01); *H04W 72/1215* (2013.01); *H04W 8/12* (2013.01); *H04W 84/042* (2013.01)

(58) Field of Classification Search
None
See application file for complete search history.

(56) References Cited

U.S. PATENT DOCUMENTS

2011/0237250 A1* 9/2011 Horn ................ H04W 8/20
                                                 455/433
2011/0258327 A1   10/2011 Phan et al.
(Continued)

FOREIGN PATENT DOCUMENTS

WO   WO 2011/147462   12/2011

OTHER PUBLICATIONS

International Search Report for International application No. PCT/SE2012/050987 Jul. 3, 2013.
(Continued)

*Primary Examiner* — Phirin Sam
(74) *Attorney, Agent, or Firm* — Patent Portfolio Builders, PLLC

(57) ABSTRACT

Embodiments herein relate to a method in a first network node (16) for enabling device to device, D2D, communication between a first device (10) and a second device (13). The first device (10) is served by a first public land mobile network comprising the first network node (16) and the second device (13) is served by a second public land mobile network. The first network node (16) receives, from the second device (13), via the second public land mobile network, or from the first device (10), a request for permission for the second device (13) of roaming to the first public land mobile network enabling the D2D communication. The request requests access to a resource controlled by the first network node (16) of the first public land mobile network. The first network node (16) decides whether to grant the request based on a position related information of the second device (13) and/or the first device (10).

18 Claims, 11 Drawing Sheets

(51) Int. Cl.
*H04W 72/12* (2009.01)
*H04W 8/12* (2009.01)
*H04W 84/04* (2009.01)

(56) References Cited

U.S. PATENT DOCUMENTS

| | | | |
|---|---|---|---|
| 2012/0163235 A1* | 6/2012 | Ho | H04W 76/023 370/254 |
| 2013/0288668 A1* | 10/2013 | Pragada | H04W 12/06 455/426.1 |
| 2015/0050955 A1* | 2/2015 | Kim | H04W 4/005 455/518 |
| 2017/0048688 A1* | 2/2017 | De Foy | H04L 12/1478 |

OTHER PUBLICATIONS

PCT Notification of Transmittal of the International Preliminary Report on Patentability for International application No. PCT/SE2012/050987 Oct. 7, 2014.

\* cited by examiner

NETWORK NODES, DEVICES AND METHODS THEREIN FOR ENABLING DEVICE TO DEVICE COMMUNICATION

PRIORITY

This nonprovisional application is a U.S. National Stage Filing under 35 U.S.C. §371 of International Patent Application Serial No. PCT/SE2012/050987 filed Sep. 18, 2012, and entitled "Network Nodes, Devices and Methods Therein for Enabling Device to Device Communication".

TECHNICAL FIELD

The embodiments herein relate to network nodes, devices and methods therein. In particular, embodiments herein relate to enabling device to device communication in a radio communications network.

BACKGROUND

In a typical cellular radio system, wireless terminals, also known as mobile stations and/or user equipments (UEs), communicate via a radio access network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell uniquely in the whole mobile network may also be broadcast in the cell. The radio base stations communicate over the radio interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) for user equipments. In a forum known as the Third Generation Partnership Project (3GPP), telecommunications suppliers propose and agree upon standards for third generation networks and UTRAN specifically, and investigate enhanced data rate and radio capacity. Specifications for the Evolved Packet System (EPS) have completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to radio network controller (RNC) nodes. In general, in E-UTRAN/LTE the functions of a radio network controller (RNC) node are distributed between the radio base stations nodes, e.g., eNodeBs in LTE, and the core network. As such, the radio access network (RAN) of an EPS system has an essentially "flat" architecture comprising radio base station nodes without reporting to radio network controller (RNC) nodes.

In network assisted Device-to-Device (D2D) communications, user equipments and devices are allowed to use licensed spectrum resources to communicate directly with one another. As opposed to classical cellular communication methods, in which data is transmitted through an access point such as the radio base station, network assisted D2D communications uses a single link, also called a direct D2D link, between the two devices, thereby increasing the resource efficiency in the system.

Because of the single link usage, when two UEs or devices in the proximity of each other need to communicate using D2D technology, the devices must agree on a single set of resource, in the same frequency band, in which the D2D communication, i.e. transmission and reception of data, takes place. The resources dedicated to the D2D link may be assigned and managed by a cellular access point, e.g. eNB, as long as the communicating D2D pair belongs to the same operator and are registered at the same Public Land Mobile Network (PLMN).

Today, LTE cells are classified as suitable cells, for normal cellular services, or acceptable cells for limited services only, such as making an emergency call. Typically, cells belonging to another operator PLMN are classified as acceptable cells and the UE will keep searching for suitable cells to be able to obtain normal cellular services according to the subscription, UE capabilities and other aspects Inter-operator D2D communications is problematic, since in D2D communication cases, D2D services may be provided by a peer device, e.g. UE-A, that possibly is served by a given PLMN, say PLMN-A. In this case, devices served by PLMN-B, e.g. UE-B, cannot access the services provided by such a device, because of the national roaming restrictions widely employed in many countries worldwide.

Thus, when the devices belong to, i.e. are served by, different PLMNs, respectively, within an overlapping geographical area, establishing the D2D link becomes problematic, since the two devices do not have access to the same set of spectrum resources. This problem is exacerbated by today's practice of forbidding national roaming within a country. For example, a device of a subscriber of Operator-A may not be allowed to roam into the PLMN of Operator-B within the same country. Therefore, D2D communications between devices that are served by different PLMNs within the same country may not be established.

SUMMARY

An object herein is to provide a mechanism that enables D2D communication in a more flexible manner.

According to an aspect of embodiments herein, the object is achieved by a method in a first network node for enabling D2D communication between a first device and a second device. The first device is served by a first public land mobile network comprising the first network node and the second device is served by a second public land mobile network. The first network node receives from the second device via the second public land mobile network, or from the first device, a request for permission for the second device of roaming to the first public land mobile network enabling the D2D communication. The request requests access to a resource controlled by the first network node of the first public land mobile network. The first network node further decides whether to grant the request based on a position related information of the second device and/or the first device.

According to another aspect of embodiments herein, the object is achieved by a method in a second device for enabling D2D communication with a first device. The first device is served by a first public land mobile network and the second device is served by a second public land mobile network. The second device transmits, via the second public land mobile network, to a first network node of the first public land mobile network, a request for permission for the second device of roaming to the first public land mobile network enabling the D2D communication. The request requests access to a resource controlled by the first network node of the first public land mobile network, and the request comprises in these embodiments an identity of the first public land mobile network.

According to yet another aspect of embodiments herein, the object is achieved by a method in a first device for enabling D2D communication with a second device. The first device is served by a first public land mobile network comprising a first network node and the second device is served by a second public land mobile network. The first device discovers the second device, the first device then exchanges data with the second device. The data comprises at least identities of the public land mobile networks and identities of the first and second devices. The first device determines which public land mobile network to use out of the first public land mobile network and the second public land mobile network. The first device transmits, to the first network node of the first public land mobile network, a request for permission for the second device of roaming to the first public land mobile network enabling the D2D communication. The request requests access to a resource controlled by the first network node of the first public land mobile network.

According to still another aspect of embodiments herein, the object is achieved by a method in a second network node for enabling D2D communication between a first device and a second device. The first device is served by a first public land mobile network comprising a first network node and the second device is served by a second public land mobile network comprising the second network node. The second network node receives from the second device, a request for permission for the second device of roaming to the first public land mobile network enabling the D2D communication. The request requests access to a resource controlled by the first network node of the first public land mobile network. The request comprises, in these embodiments, an identity of the first public land mobile network. The second network node transmits to the first network node, the request or a permission request, from the second device, for permission for the second device of roaming to the first public land mobile network. The permission request requests access to a resource controlled by the first network node of the first public land mobile network.

According to an additional aspect of embodiments herein, the object is achieved by a first network node for enabling D2D communication between a first device and a second device. The first device is configured to be served by a first public land mobile network comprising the first network node, and the second device is configured to be served by a second public land mobile network. The first network node comprises a receiving circuit configured to receive, from the second device via the second public land mobile network, or from the first device, a request for permission for the second device of roaming to the first public land mobile network enabling the D2D communication. The request requests access to a resource controlled by the first network node of the first public land mobile network. The first network node further comprises a deciding circuit configured to decide whether to grant the request based on a position related information of the second device and/or the first device.

According to yet an additional aspect of embodiments herein, the object is achieved by a second device for enabling D2D communication with a first device. The first device is configured to be served by a first public land mobile network and the second device is configured to be served by a second public land mobile network. The second device comprises a transmitter configured to transmit to a first network node of the first public land mobile network, via the second public land mobile network, a request for permission for the second device of roaming to the first public land mobile network enabling the D2D communication. The request requests access to a resource controlled by the first network node of the first public land mobile network, and the request comprises, in these embodiments, an identity of the first public land mobile network.

According to still an additional aspect of embodiments herein, the object is achieved by a first device for enabling D2D communication with a second device. The first device is configured to be served by a first public land mobile network comprising a first network node, and the second device is configured to be served by a second public land mobile network. The first device comprises a discovering circuit configured to discover the second device. The first device further comprises an exchanging circuit configured to exchange data with the second device. The data comprises at least identities of the public land mobile networks and identities of the first and second devices. The first device also comprises a determining circuit configured to determine which public land mobile network to use out of the first public land mobile network and the second public land mobile network. In addition, the first device comprises a transmitter configured to transmit to the first network node of the first public land mobile network, a request for permission, for the second device, of roaming to the first public land mobile network enabling the D2D communication. The request requests access to a resource controlled by the first network node of the first public land mobile network.

According to a further aspect of embodiments herein, the object is achieved by a second network node for enabling D2D communication between a first device and a second device. The first device is configured to be served by a first public land mobile network comprising a first network node, and the second device is configured to be served by a second public land mobile network comprising the second network node. The second network node comprises a receiving circuit configured to receive from the second device, a request for permission for the second device of roaming to the first public land mobile network enabling the D2D communication. The request requests access to a resource controlled by the first network node of the first public land mobile network. In these embodiments the request comprises an identity of the first public land mobile network. The second network node further comprises a transmitting circuit configured to transmit to the first network node, the request or a permission request, from the second device, for permission for the second device of roaming to the first public land mobile network. The permission request, as the request, requests access to a resource controlled by the first network node of the first public land mobile network.

An advantage of embodiments herein is that the embodiments provide a mechanism whereby devices of a PLMN may roam into another PLMN for the usage of e.g. a subset of radio resources, e.g. only uplink or only downlink cellular resources specifically to support D2D direct mode communication, within a specific geographical area of a device in the other PLMN. This enables establishing D2D communication in a flexible manner.

BRIEF DESCRIPTION OF THE DRAWINGS

Embodiments will now be described in more detail in relation to the enclosed drawings, in which.

DETAILED DESCRIPTION

Figure 1:
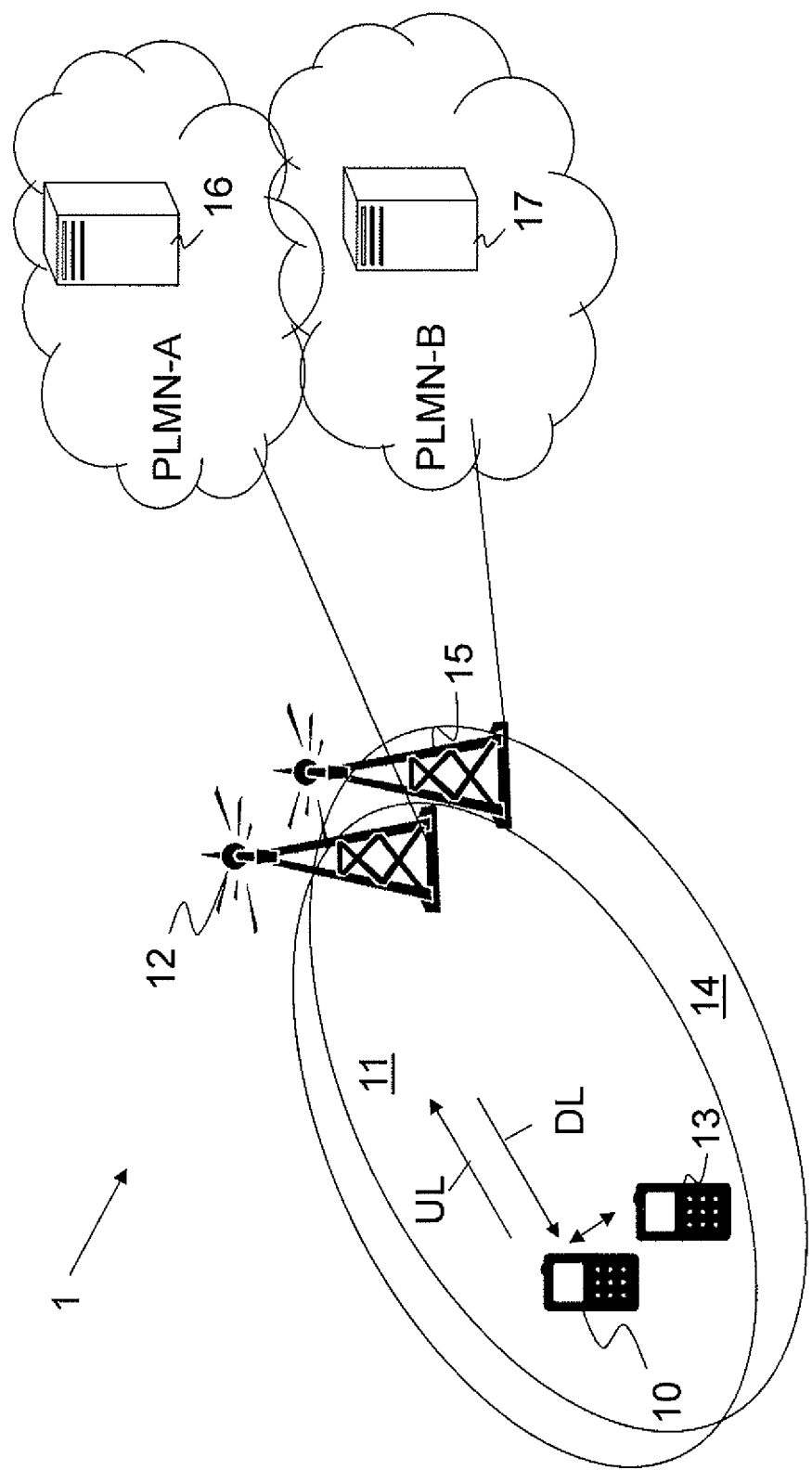
FIG. 1 is a schematic overview depicting a radio communications network according to embodiments herein.

FIG. 1 is a schematic overview depicting a radio communications network 1. The radio communications network 1 may comprise one or more radio access technologies such as Long Term Evolution (LTE), LTE-Advanced, Wideband Code Division Multiple Access (WCDMA) also called UMTS, Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The radio communications network 1 comprises a first public land mobile network (PLMN) denoted herein as PLMN-A, and a second PLMN denoted herein as PLMN-B. The first PLMN may be operated by a first operator and the second PLMN may be operated by a different operator.

A first device 10, such as a user equipment, may be served or registered to the first PLMN. The first device 10 is communicating in a first cell 11 provided by a first radio base station 12 and is communicating with the first radio base station 12. The user equipment transmit data over an air or radio interface to the radio base stations in uplink (UL) transmissions, using UL resources, and the radio base station 12 transmits data over an air or radio interface to the first device 10 in downlink (DL) transmissions, using DL resources. Furthermore, a second device 13, such as a user equipment, may be served or registered to the second PLMN. The second device 13 is communicating in a second cell 14 provided by a second radio base station 15 and is communicating with the first radio base station 15 in UL and DL transmissions.

It should be understood by the skilled in the art that device is a non-limiting term which means any wireless terminal, device or node e.g. Personal Digital Assistant (PDA), laptop, mobile, radio device, sensor, relay, mobile tablets, any device capable of communicating within a cell.

The respective radio base station 12,15 may also be referred to as e.g. a NodeB, an evolved Node B (eNB, eNode B), a base transceiver station, Access Point Base Station, base station router, or any other network unit capable to communicate with a user equipment within the cells served by the respective radio base station 12,15 depending e.g. of the radio access technology and terminology used. The respective radio base station provides radio coverage over at least one respective geographical area forming the respective cell. The cell definition may also incorporate frequency bands used for transmissions, which means that two different cells may cover the same geographical area but using different frequency bands.

In addition, the first PLMN comprises a first network node 16 controlling resources within the first PLMN, and the second PLMN comprises a second network node 17 controlling resources within the second PLMN. The first network node 16 is able to communicate with the first network node 16 as the first PLMN is reachable from the second PLMN and vice versa. Respective network node 16,17 may comprise a Mobility Management Entity (MME), Serving GPRS Support Node (SGSN), Core network node, Operation Support System (OSS) node, managing node, a radio base station or similar.

In existing technologies, such as the LTE systems, a so called Non-Access Stratum (NAS) in the respective device handles PLMN selection based on a list of available PLMNs provided by the Access Stratum (AS). NAS is a functional layer that supports signaling and traffic between respective network node and device, whereas AS is a functional layer that supports signaling and traffic between respective radio base station and device. A particular aspect of services provided by D2D communications is that the services are naturally restricted to a specific location, typically within the range of a couple of 10 or 100's of meters in the proximity of the first device 10. That is, the second device 13 does not wish to have access to a core network of the first PLMN, this is the typical case of using radio resources of a radio access network, as indeed the name "access" indicates. The second device 13 rather use some radio resources also called spectrum resources only in a proximity of the particular first device 10 for the purpose of exchanging information with the first device 10.

It follows from the nature of existing roaming concepts that once a device has roamed into another operator's PLMN, it must, inherently, be allowed to use both uplink and downlink resources to be able to communicate with a cellular access point or base station. In contrast, according to embodiments herein the D2D communication uses a single link, i.e. a device typically communicates with another device either only in the uplink resources of the cellular network or only in the downlink resources of the cellular network in both directions of the D2D link. This is because if, for example, the first device transmits in the cellular UL resources, the second device 13 must receive also in these said cellular UL resources.

Specifically, in LTE, once the second device 13 gets synchronized to the first radio base station 12 and is able to decode system information of the broadcast channel (BCH), as part of the AS procedures, it may decode a PLMN identity of the cell and pass it on to its NAS layer for possible registration at that cell.

According to embodiments herein a mechanism is provided whereby devices, such as the second device 13, of a PLMN, e.g. the second PLMN, may roam into another PLMN, e.g. the first PLMN, for the usage of a subset of the radio resources, e.g. only uplink or only downlink cellular resources specifically to support D2D direct mode communication, within a specific geographical area of the first device 10.

Thus, permitted D2D will occur in positions and areas that do not cause interference to other traffic. Radio resources used within an area may be used in another area without interfering with one another. Thus, a limited and efficient resource usage within a determined geographical area, i.e. based on position, is herein disclosed.

Figure 2:
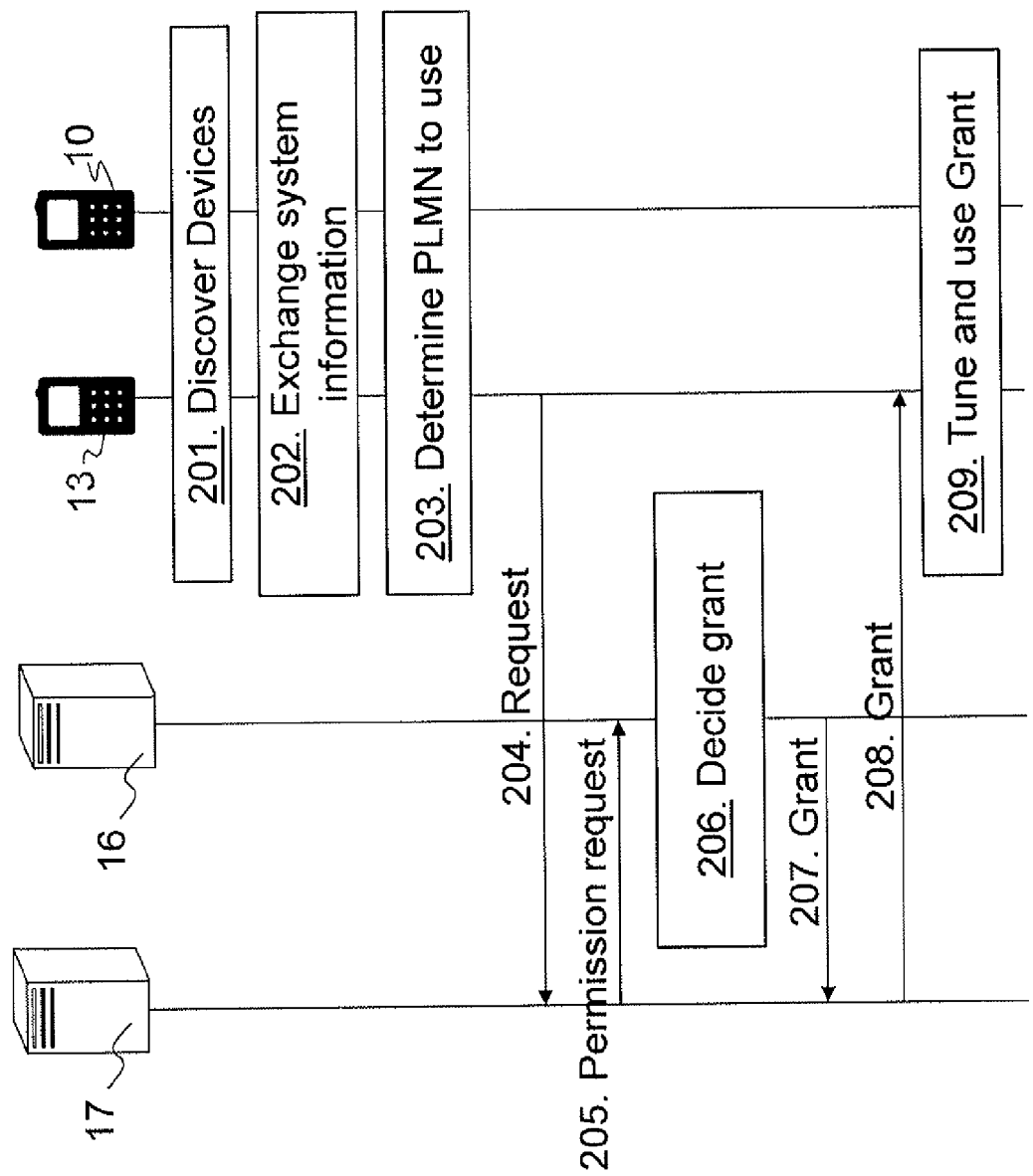
FIG. 2 is a schematic combined flowchart and signaling scheme depicting embodiments herein.

FIG. 2 is a schematic combined flow chart and signaling scheme depicting embodiments herein to enable D2D communications between the first device 10 and the second device 13. As stated above, the first and second devices are being served by different PLMNs, respectively.

Action 201. The first device 10 and the second device 13 may be engaged in D2D discovery procedures using existing technologies, also referred to as detecting presence of one another. The second device 13 may have detected the presence of the first device 10 and, for example, based on a received beacon signal from the first device 10 it has identified that it wishes to establish a D2D communications session with the first device 10 using the spectrum resources of the first PLMN. For example, the first device 10 may broadcast a beacon signal in its vicinity such that the beacon signal contains information about an identity of the first device 10 or about a specific service that the first device 10 offers to surrounding user equipments. For example, the first device 10 may identify itself as a printer offering high quality colour printing services. Once the second device 13 detects and decodes this beacon signal, it may become interested to transfer content or inquiry of other details of the services offered by the first device e.g. printing a document, or vice versa.

Action 202. The first device 10 and the second device 13 may exchange information such as e.g. serving PLMN ID, UE-ID etc. The information may be exchanged over Wi-Fi or Bluetooth or similar. For example, the first device 10 and the second device 13 may use broadcasting in the Industrial, Scientific, and Medical (ISM) band to announce fundamental information, including information about their capabilities, serving PLMN and offered services or services in which they are interested in.

Action 203. The first device 10 and the second device 13 may determine what PLMN to use. For example, after the discovery procedure in action 201 the first device 10 may send an invite message to its own first PLMN or the second device 13 may send a request to the first device's first PLMN, or vice versa. Alternatively or additionally, when the second device 13 decodes the beacon signal broadcast by the first device 10, the default behaviour of the second device 13 may be to consider the serving PLMN ID, exemplified as ID of the first PLMN, in the exchanged information, as a hosting PLMN for D2D communications. In the illustrated example the second device 13 wants to use the first PLMN of the first device 10.

Action 204. The second device 13 may send a request for permission of roaming to the first PLMN, thus, enabling the D2D communication. The request may be referred to as Local Roaming Request, a "Local Roaming Request into PLMN-A" request. The request is sent to its own serving PLMN, i.e. the second PLMN, via its serving radio base station 15, to the second network node 17 such as a MME, SGSN, Core network node, OSS node, managing node or similar. The request may comprise requested PLMN ID, Position related information for the second device 13, and e.g. first device ID, second device ID, service indication, and information related to the capabilities of the first device 10 and the second device 13, and/or similar. Position related information comprises e.g. Global Positioning system (GPS) information of the second device 13, Cell ID of the first cell 11 and/or the second cell 14, and/or position of the first device 10.

Action 205. The second network node 17 of the second PLMN may send a permission request to the first network node 16 of the first PLMN requesting a local roaming permission for the second device 13. This "permission request" may be different from the request sent in action 204 in that the second network node 17 may complement the request with PLMN specific information, e.g. PLMN identity of the second PLMN, radio interface technologies or frequency bands supported in the second PLMN, and information specific to the second device 13, for example position, subscriber data, e.g. current limitations of the available/ subscribed services of the second device 13, information on whether the subscriber of second device 13 uses prepaid or post-paid services, etc. Alternatively, the permission request may also be the request sent in action 204 and the second network node 17 forwards the request to the first network node 16.

Action 206. The first network node 16 of the first PLMN considers the request or the permission request for the second device 13. In this process, the first network node 16 of the first PLMN may take into account the identity and subscription data of first device 10 as well as the second device 13, the existing business agreements between the first PLMN and the second PLMN, time of day, nature of the requested D2D communications, etc. Thus, the first network node 16 of the first PLMN determines whether the second device 13 is granted a roaming based on position but may also take into account e.g. available resources, service request, load in the area and similar. The position may be obtained from the request or from data within the first PLMN. The first network node 16 of the first PLMN may employ similar admission control procedures as a basis that are available in existing technology, but extended with taking into account the specific load situation in the area of the first device 10, e.g. in parts of the first cell 11, the service request of the second device 13 and the positions. E.g. geographical positions of the first device 10 and/or the second device 13, and/or distance between the first device 10 and the second device 13. For example, the first network node 16 may comprise a limitation or limitations that may restrict D2D communication to devices that are at most 50 meters from each other or to devices that may use cellular uplink resources for signal transmission and reception or devices that support a specific frequency band. The first network node 16 then compares data of the request and present usage with said limitations when deciding whether to grant the request.

Action 207. If the first network node 16 of the first PLMN grants access to the second device, that is, allows roaming of the second device 13 to the first PLMN, the first network node 16 forms a grant, grant message, roaming grant message or a "Local Roaming Grant" message. This grant message may comprise specific GPS coordinates or PLMN cell identities into which the roaming is granted and/or indication of radio resources to use, single UL resources or DL resources. Also, this message may comprise other restrictions, such as maximum allowed transmit power or maximum distance from a given set of GPS coordinates or maximum number of physical resource blocks or frequency channels in an LTE system. The first network node 16 of the first PLMN may send this grant message to the second network node 17 of the second PLMN as illustrated but may additionally or alternatively send this directly to the first device 10 of the first PLMN.

Action 208. Once the second network node 17 receives the grant message from the first network node 16, the second network node 17 may forward or relay this grant message over to the second device 13. The second network node 17 may further include data into the grant message before forwarding the grant message or create another message, similar to the grant message, comprising data from the grant message and data from the second network node 17.

Action 209. When the second device 13 receives the grant message, or the similar message, the D2D connection is set up. For example, the second device 13 tunes its receiver to the specific PLMN, i.e. the first PLMN, carrier frequency indicated in the grant message to establish the D2D connection with the first device 10. As the grant message indicates the radio resource to use, either a DL resource or an UL resource of the first PLMN, the D2D connection is set up over the radio resource. Once the resources for D2D communications are identified, the D2D connection setup procedure may follow existing technology components. For example, the second radio base station 15 may signal or broadcast the specific carrier frequency or frequency channels that are reserved for the D2D communication between the first device 10 and the second device 13.

Thus, the first device 10 and the second device 13 are enabled to communicate over the set up D2D connection even when being operated by different PLMNs where spectrum resources are used locally in an efficient manner.

Figure 3:
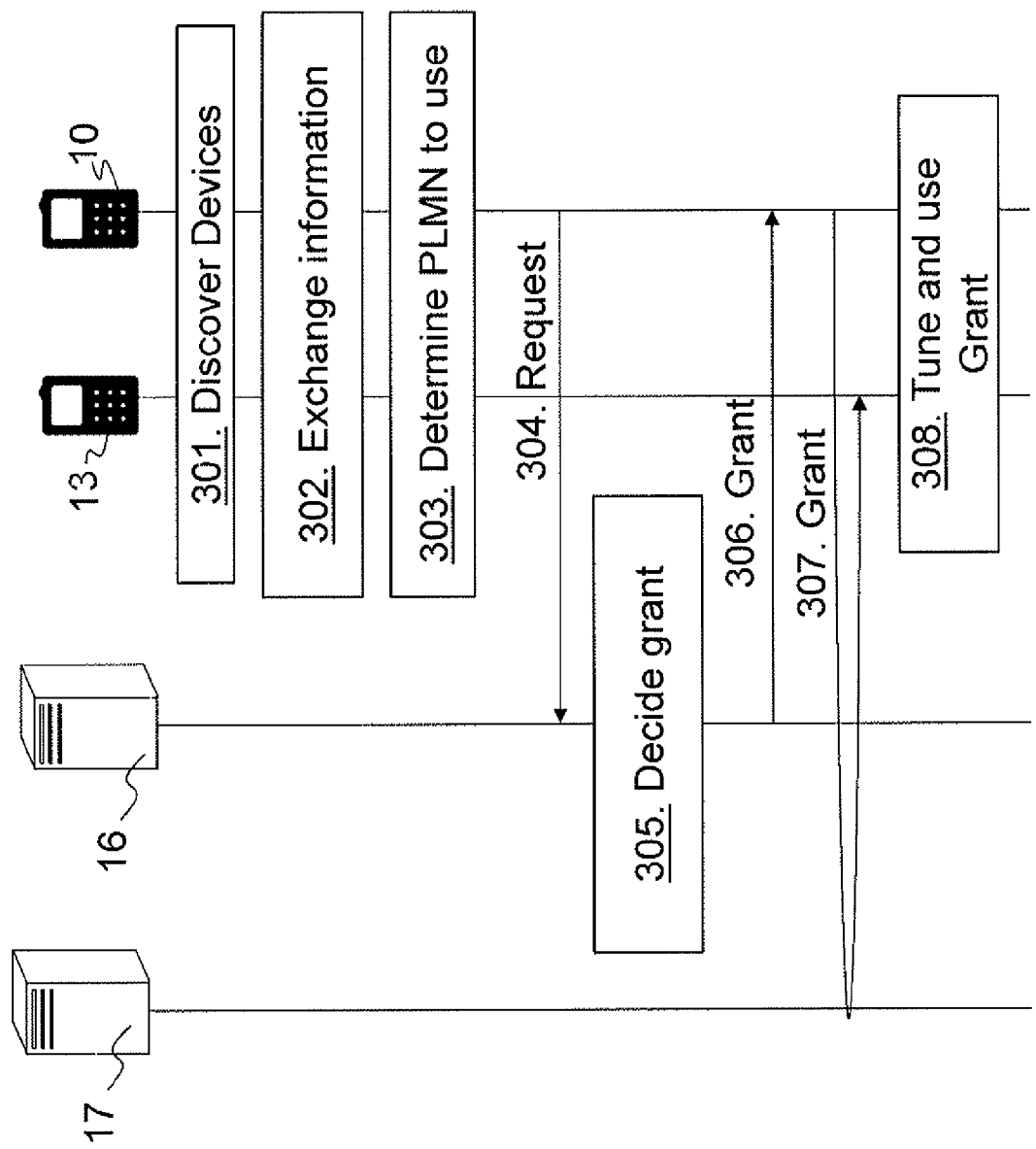
FIG. 3 is a schematic combined flowchart and signaling scheme depicting embodiments herein.

FIG. 3 is a schematic combined flow chart and signaling scheme depicting embodiments herein to enable D2D communications between the first device 10 and the second device 13. As stated above, the first and second devices are being served by different PLMNs, respectively.

Action 301. This action corresponds to action 201 in FIG. 2. The first device 10 and the second device 13 may be engaged in D2D discovery procedures using existing technologies, also referred to as detecting presence of one another. The second device 13 may have detected the presence of the first device 10 and, for example, based on a received beacon signal from the first device 10 it has identified that it wishes to establish a D2D communications session with the first device 10 using the spectrum resources of the first PLMN. For example, the first device 10 may broadcast a beacon signal in its vicinity such that the beacon signal contains information about an identity of the first device 10 or about a specific service that the first device 10 offers to surrounding user equipments. For example, the first device 10 may identify itself as a printer offering high quality colour printing services. Once the second device 13 detects and decodes this beacon signal, it may become interested to transfer content or inquiry of other details of the services offered by the first device e.g. printing a document.

Action 302. This action corresponds to action 202 in FIG. 2. The first device 10 and the second device 13 may exchange information such as e.g. serving PLMN ID, UE-ID etc. The information may be exchanged over Wi-Fi or Bluetooth or similar. For example, the first device 10 and the second device 13 may use broadcasting in the ISM band to announce fundamental information, including information about their capabilities, serving PLMN and offered services or services in which they are interested in.

Action 303. This action corresponds to action 203 in FIG. 2. The first device 10 and the second device 13 may determine what PLMN to use. For example, after the discovery procedure in action 201 the first device 10 may send an invite message to its own first PLMN or the second device 13 may send a request to the first device's first PLMN, or vice versa. Alternatively or additionally, when the second device 13 decodes the beacon signal broadcast by the first device 10, the default behaviour of the second device 13 may be to consider the serving PLMN ID, exemplified as ID of the first PLMN, in the exchanged information, as a hosting PLMN for D2D communications. In the illustrated example the second device 13 wants to use the first PLMN of the first device 10.

Action 304. In this illustrated example, the first device 10 may send a request for permission, for the second device 13, to roam into the first PLMN, thus, enabling the D2D communication. The request may be referred to as Local Roaming Request, a "Local Roaming Request into PLMN-A" request or similar. The request is sent to the first device's own serving PLMN, i.e. the first PLMN, via the serving radio base station 12, to the first network node 16 such as a MME, SGSN, Core network node, OSS node, managing node or similar. The request may comprise requested PLMN ID, Position related information for the second device 13, and e.g. first device ID, second device ID, service indication, and information related to the capabilities of the first device 10 and the second device 13, and/or similar. Position related information comprises e.g. GPS information of the second device 13, Cell ID of the first cell 11 and/or the second cell 14, distance between the first device 10 and the second device 13 and/or position of the first device 10. It should here be noted that the request may correspond to the permission request in action 205 in FIG. 2.

Action 305. The action corresponds to the action 206 in FIG. 2. The first network node 16 of the first PLMN considers the request or the permission request for the second device 13. In this process, the first network node of the first PLMN may take into account the identity and subscription data of first device 10 as well as the second device 13, the existing business agreements between the first PLMN and the second PLMN, time of day, nature of the requested D2D communications, etc. Thus, the first network node 16 of the first PLMN decides or determines whether the second device 13 is granted a roaming based on position, obtained from the request or from data within the first PLMN, but may also take into account e.g. available resources, service request, load in the area and similar. The first network node 16 of the first PLMN may employ similar admission control procedures as a basis that are available in existing technology, but extended with taking into account the specific load situation in the area of the first device 10. E.g. take account in parts of the first cell 11, the service request of the second device 13 and the positions, e.g. geographical positions of the first device 10 and/or the second device 13, and/or distance between the first device 10 and the second device 13. For example, the first network node 16 may comprise a limitation or limitations that may restrict D2D communication to devices that are at most 50 meters from each other or to devices that may use cellular uplink resources for signal transmission and reception or devices that support a specific frequency band. The first network node 16 then compares data of the request and present usage with said limitations when deciding whether to grant the request.

Action 306. If the first network node 16 of the first PLMN grants access to the second device 13, that is, allows roaming of the second device 13 to the first PLMN, the first network node 16 forms a grant, grant message, roaming grant message or a "Local Roaming Grant" message. This grant message may comprise specific GPS coordinates or PLMN cell identities into which the roaming is granted and/or indication of radio resources to use, single UL resources or DL resources. Also, this message may comprise other restrictions, such as maximum allowed transmit power or maximum distance from a given set of GPS coordinates or maximum number of physical resource blocks or frequency channels in an LTE system. The first network node 16 of the first PLMN may send this grant message to the first device 10 of the first PLMN as illustrated but may additionally or alternatively send this to the second network node 17 of the second PLMN.

Action 307. Once the first device 10 receives the grant message from the first network node 16, it may relay this grant message over to the second device 13 via the first network node 16 and/or the second network node 17. The first device 10 may further include data into the grant message before forwarding the grant message or create another message, similar to the grant message, comprising data from the grant message and data from the first device 16. It should here be noted that the first device 10 may relay the grant via Wi-Fi or Bluetooth directly to the second device 17.

Action 308. This action corresponds to the action 209 in FIG. 2. When the second device 13 receives the grant message, or the similar message, the D2D connection is set up. For example, the second device 13 tunes its receiver to the specific PLMN, i.e. the first PLMN, carrier frequency indicated in the grant message to establish the D2D connection with the first device. As the grant message indicates the radio resource to use, either a DL resource or an UL resource of the first PLMN, the D2D connection is set up over the radio resource. Once the resources for D2D communications are identified, the D2D connection setup procedure may follow existing technology components. For example, the second radio base station 15 may signal or broadcast the specific carrier frequency or frequency channels that are reserved for the D2D communication between the first device 10 and the second device 13.

Thus, the first device 10 and the second device 13 are enabled to communicate over the set up D2D connection even when being operated by different PLMNs where spectrum resources are used locally in an efficient manner.

Figure 4:
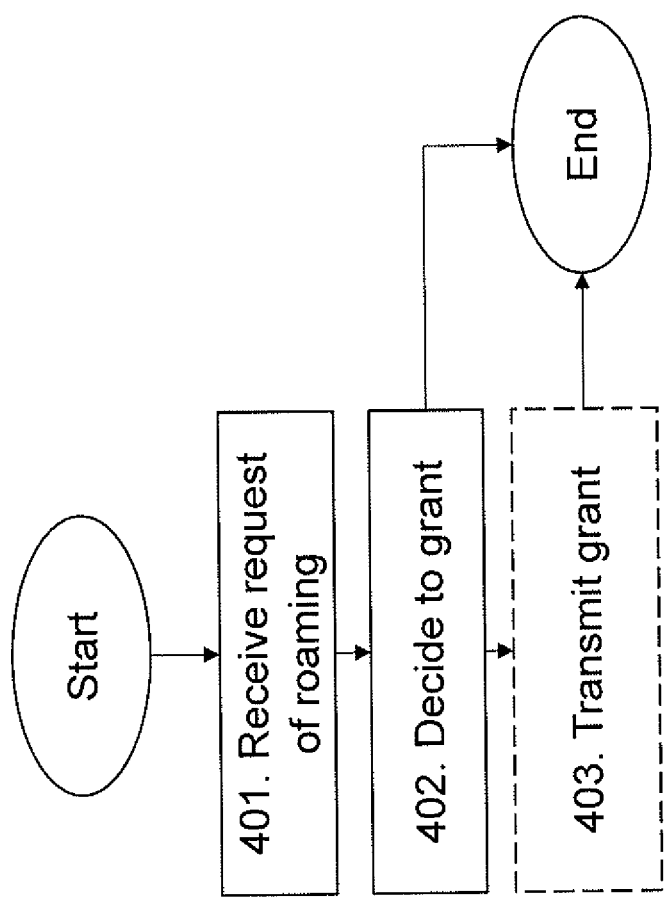
FIG. 4 is a schematic flowchart depicting a method in a first network node according to embodiments herein.

The method actions in the first network node 16, for example a PLMN managing node or similar, for enabling D2D communication between the first device 10 and the second device 13 according to some general embodiments will now be described with reference to a flowchart depicted in FIG. 4. The actions do not have to be taken in the order stated below, but may be taken in any suitable order. Actions performed in some embodiments are indicated by a dashed box. The first device 10 is served by the first PLMN comprising the first network node 16. The second device 13 is served by the second PLMN.

Action 401. The first network node 16 receives from the second device 13, via the second PLMN, or from the first device 10, the request for permission for the second device 13 of roaming to the first PLMN enabling the D2D communication. The request requests access to a resource controlled by the first network node 16 of the first PLMN. In addition, the request may comprise position related information of the second device 13 and/or the first device 10.

Action 402. The first network node 16 decides whether to grant the request based on the position related information of the second device 13 and/or the first device 10 e.g. comprised in the request. The first network node 16 may decide by selecting a subset of radio resources, uplink or downlink resources, to be allocated for the D2D communication, based on the position related information of the second device 13 and/or the first device 10. Thus, the first network node 16 may perform a localized roaming decision, taking distance between the first and second device into account or only permitting D2D communications over a geographical area. The position of the first device may already be stored or known to the first network node 16. The first network node may decide based on load, time of day, and/or service indicator. This information may be retrieved from the first PLMN or from the second PLMN or the received request. This action corresponds to the actions 206 in FIG. 2 and action 305 in FIG. 3.

Action 403. The first network node 16 may transmit, to the first device 10 or the second device 13 via the second PLMN, the grant of the received request when decided to grant the request. The grant comprises indication of at least one of selected radio resource, position information and maximum transmit power. Thus, the grant may state resources to use, within a certain geographical area or distance between the first and second devices, threshold of a transmit power, for a certain kind of service or similar. This action corresponds to actions 207, 208 in FIG. 2 and action 306, 307 in FIG. 3.

Figure 5:
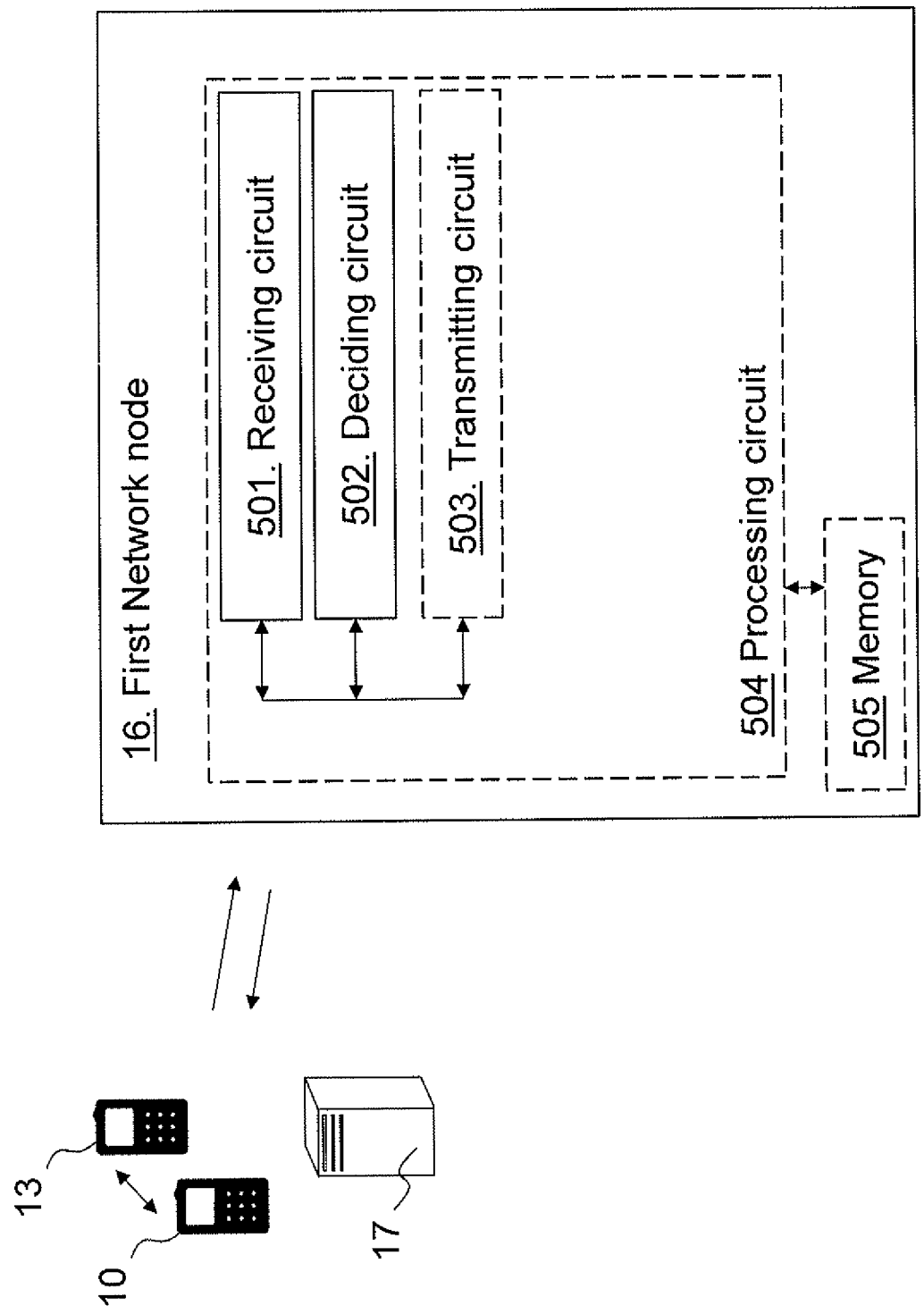
FIG. 5 is a block diagram depicting a first network node according to embodiments herein.

FIG. 5 is a block diagram depicting the first network node 16 according to embodiments herein for enabling D2D communication between the first device 10 and the second device 13. The first device 10 is configured to be served by a first PLMN comprising the first network node 16 and the second device 13 is configured to be served by a second PLMN.

The first network node 16 comprises a receiving circuit 501 configured to receive, from the second device 13 via the second PLMN, or from the first device 10, a request for permission for the second device 13 of roaming to the first PLMN enabling the D2D communication. The request requests access to a resource controlled by the first network node 16 of the first PLMN. The request may comprise position related information of the second device 13 and/or the first device 10.

The first network node 16 further comprises a deciding circuit 502 configured to decide whether to grant the request based on the position related information e.g. retrieved from first PLMN or comprised in the request. The deciding circuit 502 may further be configured to select a subset of radio resources, uplink or downlink resources, to be allocated for the D2D communication, based on the position related information of the second device 13 and/or the first device 10. In some embodiments the deciding circuit 502 may further be configured to decide based on load, time of day, and/or service indicator.

In some embodiments the first network node 16 further comprises a transmitting circuit 603 configured to transmit to the first device 10 or the second device 13, via the second PLMN, a grant of the received request when decided to grant the request. The grant may comprise indication of at least one of: selected radio resource, position information and maximum transmit power.

The embodiments herein for enabling D2D communications may be implemented through one or more processors, such as a processing circuit 504 in the first network node 16 depicted in FIG. 5, together with computer program code for performing the functions and/or method actions of the embodiments herein. The program code mentioned above may also be provided as a computer program product, for instance in the form of a data carrier carrying computer program code for performing embodiments herein when being loaded into the first network node 16. One such carrier may be in the form of a CD ROM disc. It is however feasible with other data carriers such as a memory stick. The computer program code may furthermore be provided as pure program code on a server and downloaded to the first network node 16.

The first network node 16 may further comprise a memory 505 comprising one or more memory units and may be used to store for example data such as identities, positions, limitations, application to perform the methods herein when being executed on the first network node 16, and/or similar.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 6:
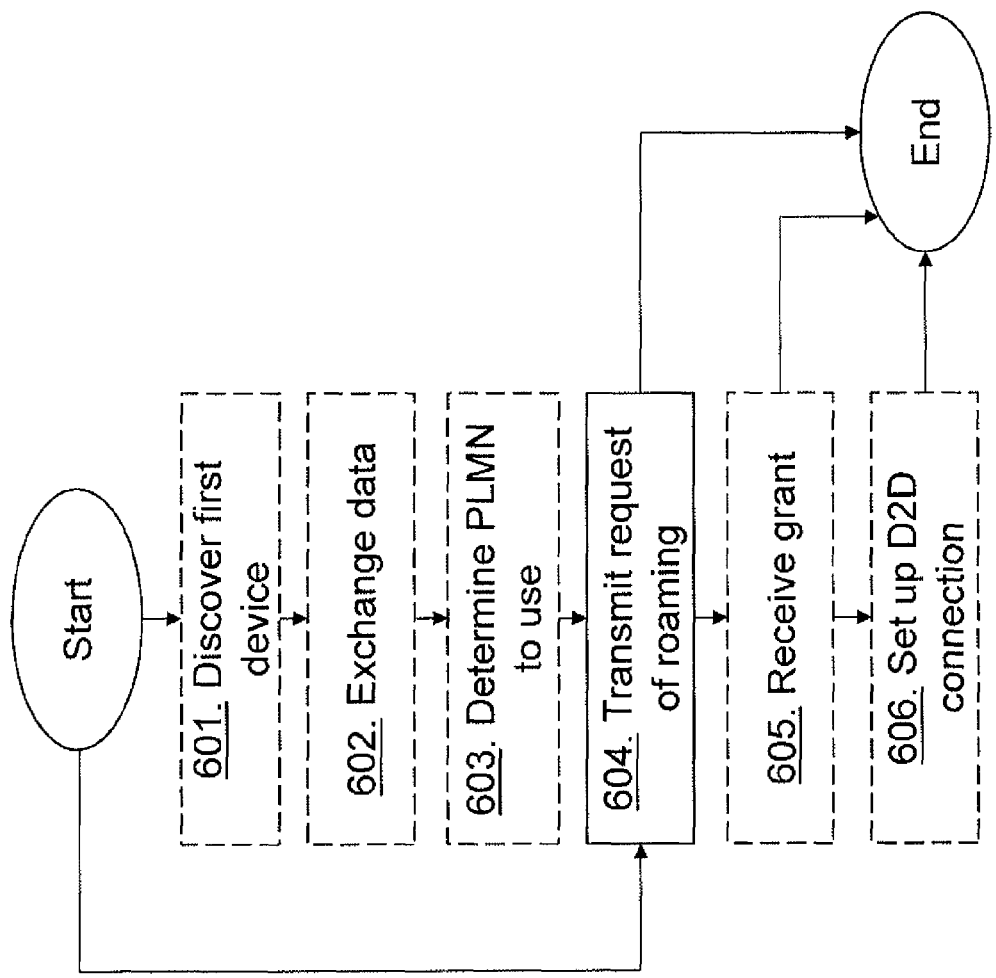
FIG. 6 is a schematic flowchart depicting a method in a second device according to embodiments herein.

The method actions in the second device 13, for example a communication device or similar, for enabling D2D communication with the first device 10 according to some general embodiments will now be described with reference to a flowchart depicted in FIG. 6. The actions do not have to be taken in the order stated below, but may be taken in any suitable order, Actions performed in some embodiments are indicated by a dashed box. The first device 10 is served by the first PLMN and the second device 13 is served by the second PLMN.

Action 601. The second device 13 may discover the first device 10. This action corresponds to action 201 in FIG. 2 and action 301 in FIG. 3.

Action 602. The second device 13 may exchange data with the first device 10. The data comprises at least identities of the PLMNs and identities of the first and second devices, also referred to as serving PLMN-IDs or UE-IDs, this may be comprised in system information or similar, and may be exchanged via Bluetooth or similar. This action corresponds to action 202 in FIG. 2 and action 302 in FIG. 3.

Action 603. The second device 13 may determine which PLMN to use out of the first PLMN and the second PLMN. Determines may e.g. be based on predetermined settings such as setting of a request to the first device 10, which request states that the requested part's or the requesting part's PLMN should be used. The device that first detects the other device should request to roam to the other device PLMN or should invite the other device to roam to its PLMN. This action corresponds to action 203 in FIG. 2 and action 303 in FIG. 3.

Action 604. The second device 13 transmits to the first network node 16 of the first PLMN via the second PLMN, a request for permission for the second device 13 of roaming to the first PLMN enabling the D2D communication. The request requests access to a resource controlled by the first network node 16 of the first PLMN. The request comprises identity of the first PLMN, and may comprise the position related information of the second device 13 and/or the first device 10. This action corresponds to action 204 in FIG. 2.

Action 605. The second device 13 may in some embodiments receive from the first network node 16, via the second PLMN or the first device 10, the grant of the request. The grant may comprise at least one of: selected radio resource, position information and maximum transmit power.

Action 606. The second device 13 may set up a D2D connection to the first device 10 based on the received grant, thereby performing roaming to the first PLMN. This action corresponds to action 209 in FIG. 2 and action 308 in FIG. 3.

Figure 7:
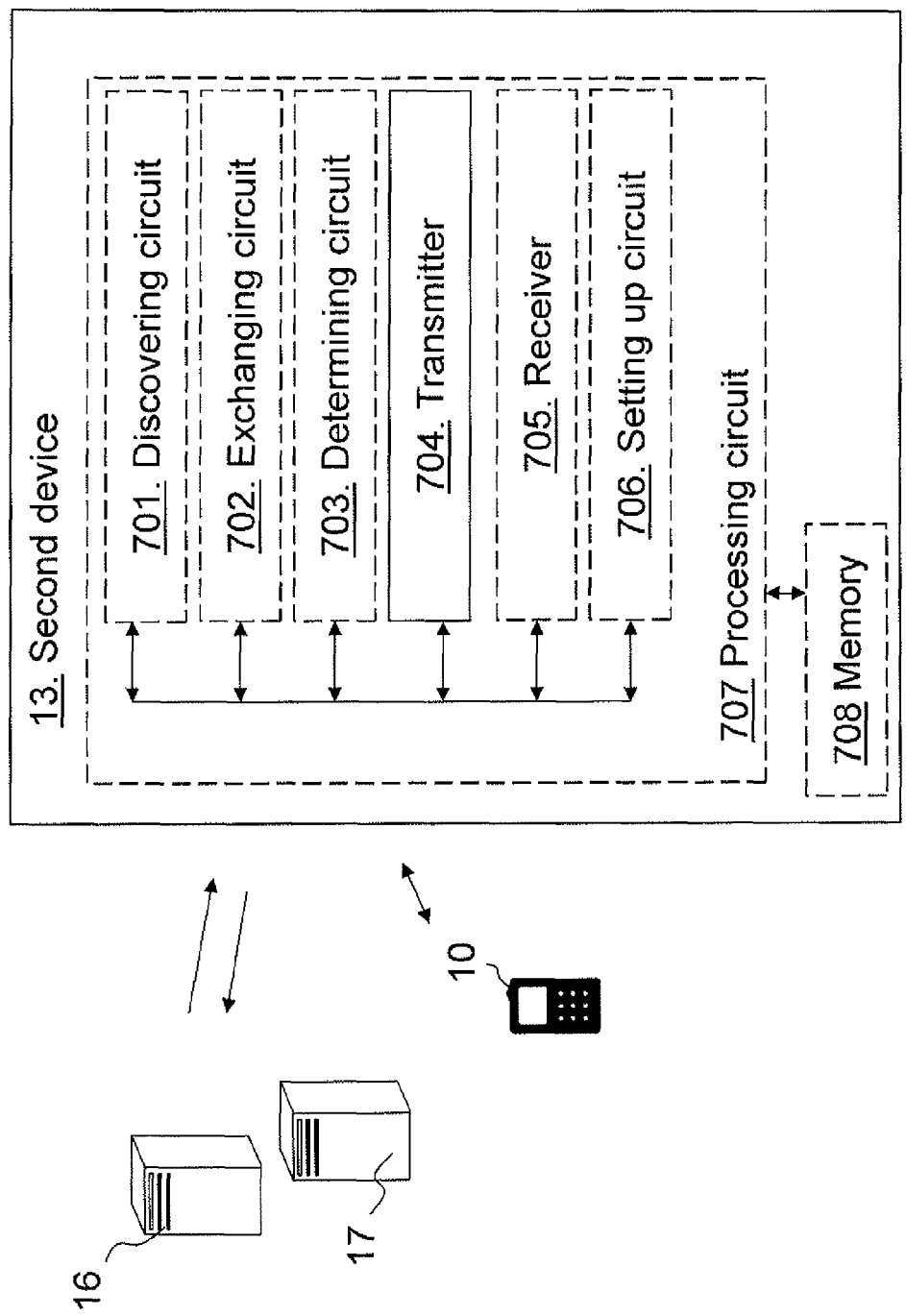
FIG. 7 is a block diagram depicting a second device according to embodiments herein.

FIG. 7 is a block diagram depicting the second device 13 according to embodiments herein for enabling D2D communication with the first device 10, The first device 10 is configured to be served by the first PLMN and the second device 13 is configured to be served by the second PLMN.

In some embodiments the second device 13 comprises a discovering circuit 701 configured to discover the first device 10, and an exchanging circuit 702 configured to exchange data with the first device 10. The data comprises at least identities of the PLMNs and identities of the first and second devices. In addition, the second device may comprise a determining circuit 703 configured to determine which PLMN to use out of the first PLMN and the second PLMN.

The second device 13 comprises a transmitter 704 configured to transmit to the first network node 16 of the first PLMN, via the second PLMN, a request for permission for the second device 13 of roaming to the first PLMN enabling the D2D communication. The request requests access to a resource controlled by the first network node 16 of the first PLMN, The request comprises an identity of the first PLMN and may comprise position related information of the second device 13 and/or the first device 10.

In some embodiments the second device 13 comprises a receiver 705 configured to receive from the first network node 16, via the second PLMN or the first device 10, a grant of the request. The grant may comprise at least one of: selected radio resource, position information and maximum transmit power.

The second device 13 may comprise a setting up circuit 706 configured to set up a D2D connection to the first device 10 based on the received grant, thereby performing roaming of the second device to the first PLMN.

The embodiments herein for enabling D2D communications may be implemented through one or more processors, such as a processing circuit 707 in the second device 13 depicted in FIG. 7, together with computer program code for performing the functions and/or method actions of the embodiments herein. The program code mentioned above may also be provided as a computer program product, for instance in the form of a data carrier carrying computer program code for performing embodiments herein when being loaded into the second device 13. One such carrier may be in the form of a CD ROM disc. It is however feasible with other data carriers such as a memory stick. The computer program code may furthermore be provided as pure program code on a server and downloaded to the second device 13.

The second device 13 may further comprise a memory 708 comprising one or more memory units and may be used to store for example data such as data, PLMN identities, UE-identities, positions, limitations, application to perform the methods herein when being executed on the second device 13, and/or similar.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 8:
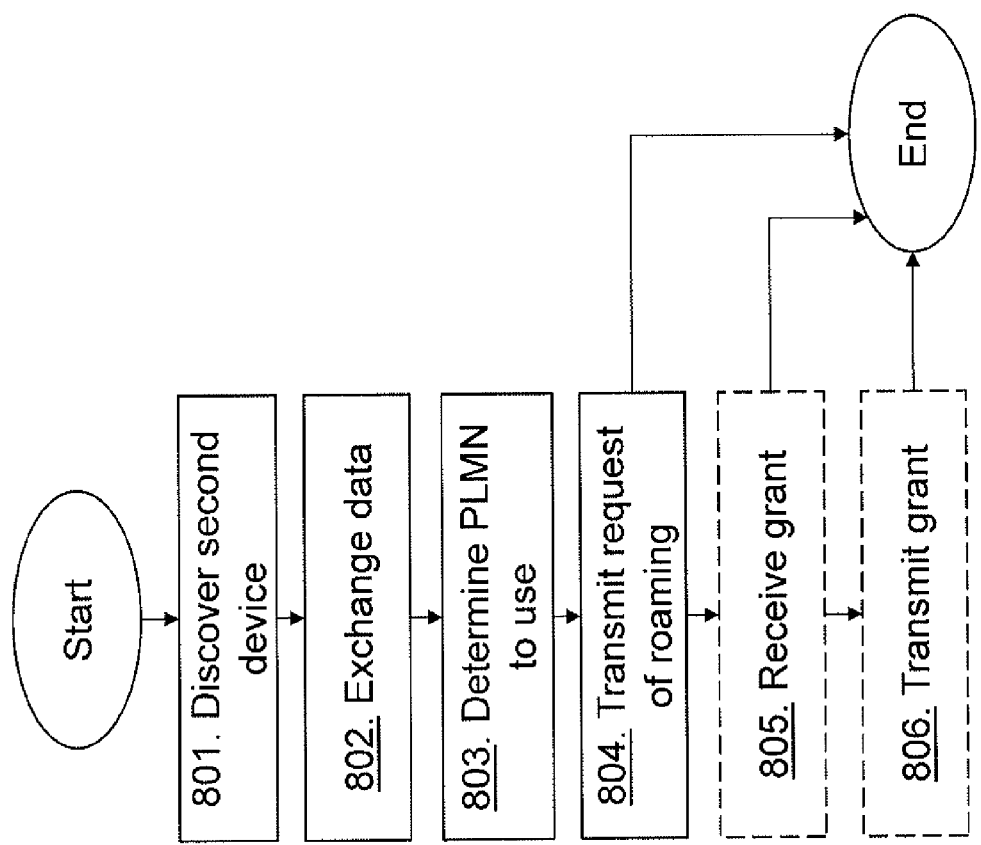
FIG. 8 is a schematic flowchart depicting a method in a first device according to embodiments herein.

The method actions in the first device 10, for example a communication device or similar, for enabling D2D communication with the second device 13 according to some general embodiments will now be described with reference to a flowchart depicted in FIG. 8. The actions do not have to be taken in the order stated below, but may be taken in any suitable order. Actions performed in some embodiments are indicated by a dashed box. The first device 10 is served by the first PLMN comprising the first network node 16 and the second device 13 is served by the second PLMN.

Action 801. The first device 10 discovers the second device 13. This action corresponds to the action 201 in FIG. 2 and action 301 in FIG. 3.

Action 802. The first device 10 exchanges data with the second device 13. The data comprises at least identities of the PLMNs and identities of the first and second devices. This action corresponds to the action 202 in FIG. 2 and action 302 in FIG. 3.

Action 803. The first device 10 determines which PLMN to use out of the first PLMN and the second PLMN. This action corresponds to the action 203 in FIG. 2 and action 303 in FIG. 3.

Action 804. The first device 10 transmits to the first network node 16 of the first PLMN, a request for permission, for the second device 13, of roaming to the first PLMN enabling the D2D communication. The request requests access to a resource controlled by the first network node 16 of the first PLMN, and the request may comprise position related information of the second device 13 and/or the first device 10. This action corresponds to the action 304 in FIG. 3.

Action 805. The first device 10 may receive from the first network node 16 of the first PLMN, the grant of the request. The grant comprises at least one of: a radio resource indication, position information and maximum transmit power.

Action 806. The first device 10 may transmit the grant to the second device 13, directly, via the first PLMN, or via the second PLMN, to set up a D2D connection to the second device 13. This action corresponds e.g. to the action 307 in FIG. 3.

Figure 9:
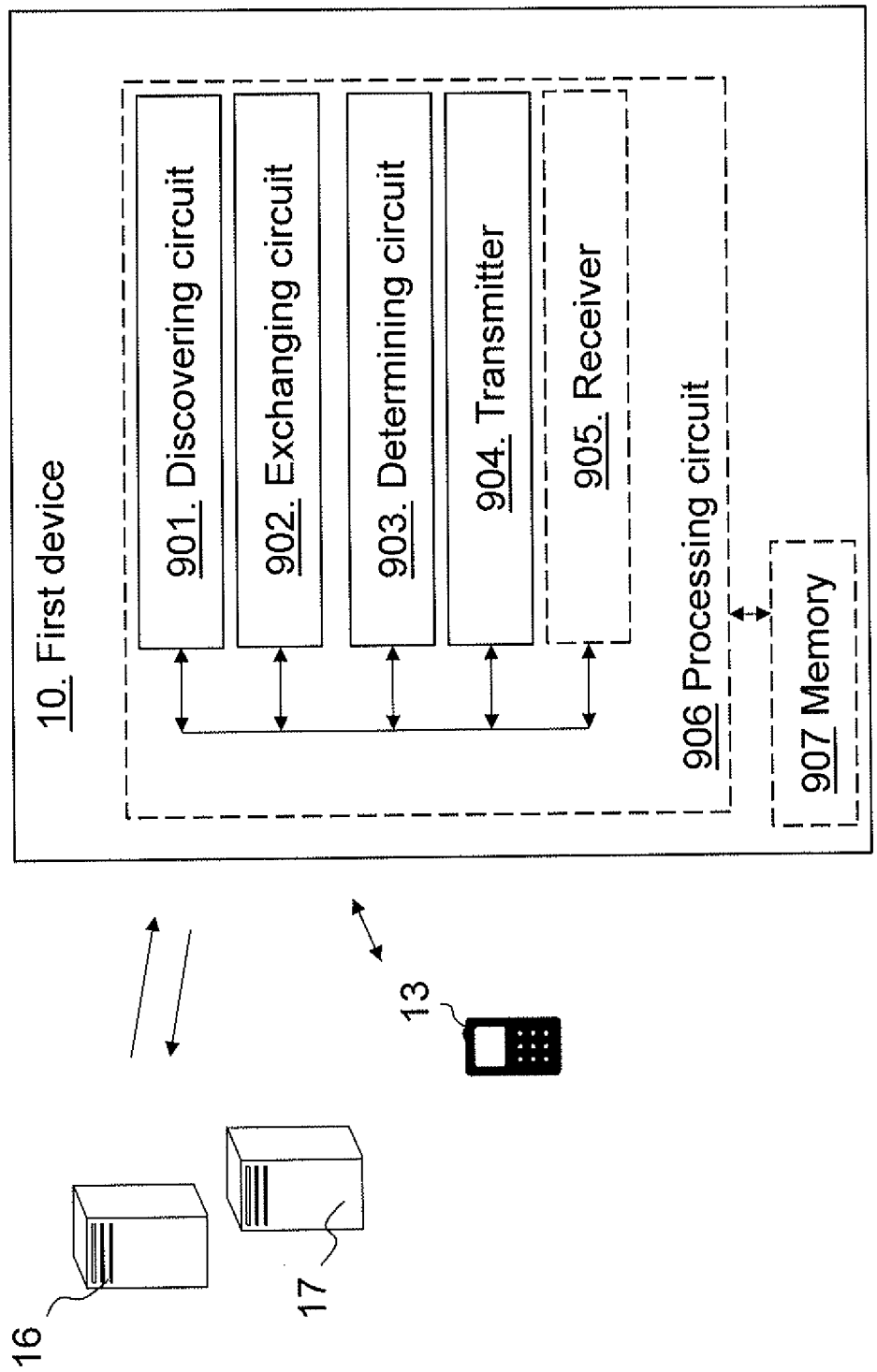
FIG. 9 is a block diagram depicting a first device according to embodiments herein.

FIG. 9 is a block diagram depicting the first device 10 according to embodiments herein for enabling D2D communication with the second device 13. The first device 10 is configured to be served by the first PLMN comprising the first network node 16 and the second device 13 is configured to be served by the second PLMN.

The first device 10 comprises a discovering circuit 901 configured to discover the second device 13.

The first device 10 further comprises an exchanging circuit 902 configured to exchange data with the second device 13. The data comprises at least identities of the PLMNs and identities of the first and second devices.

The first device 10 also comprises a determining circuit 903 configured to determine which PLMN to use out of the first PLMN and the second PLMN.

In addition, the first device 10 comprises a transmitter 904 configured to transmit to the first network node 16 of the first PLMN, a request for permission, for the second device 13, of roaming to the first PLMN enabling the D2D communication. The request requests access to a resource controlled by the first network node 16 of the first PLMN, and the request may comprise position related information of the second device 13 and/or the first device 10. The transmitter 904 may further be configured to transmit the grant to the second device, directly, via the first PLMN, or via the second PLMN, to set up a D2D connection to the second device 13.

The first device may comprise a receiver 905 configured to receive from the first network node 16 of the first PLMN, a grant of the request, which grant comprises at least one of: a radio resource indication, position information and maximum transmit power.

The embodiments herein for enabling D2D communications may be implemented through one or more processors, such as a processing circuit 906 in the first device 10 depicted in FIG. 9, together with computer program code for performing the functions and/or method actions of the embodiments herein. The program code mentioned above may also be provided as a computer program product, for instance in the form of a data carrier carrying computer program code for performing embodiments herein when being loaded into the first device 10. One such carrier may be in the form of a CD ROM disc. It is however feasible with other data carriers such as a memory stick. The computer program code may furthermore be provided as pure program code on a server and downloaded to the first device 10.

The first device 10 may further comprise a memory 907 comprising one or more memory units and may be used to store for example data such as data, PLMN identities, UE-identities, positions, limitations, application to perform the methods herein when being executed on the first device 10, and/or similar.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 10:
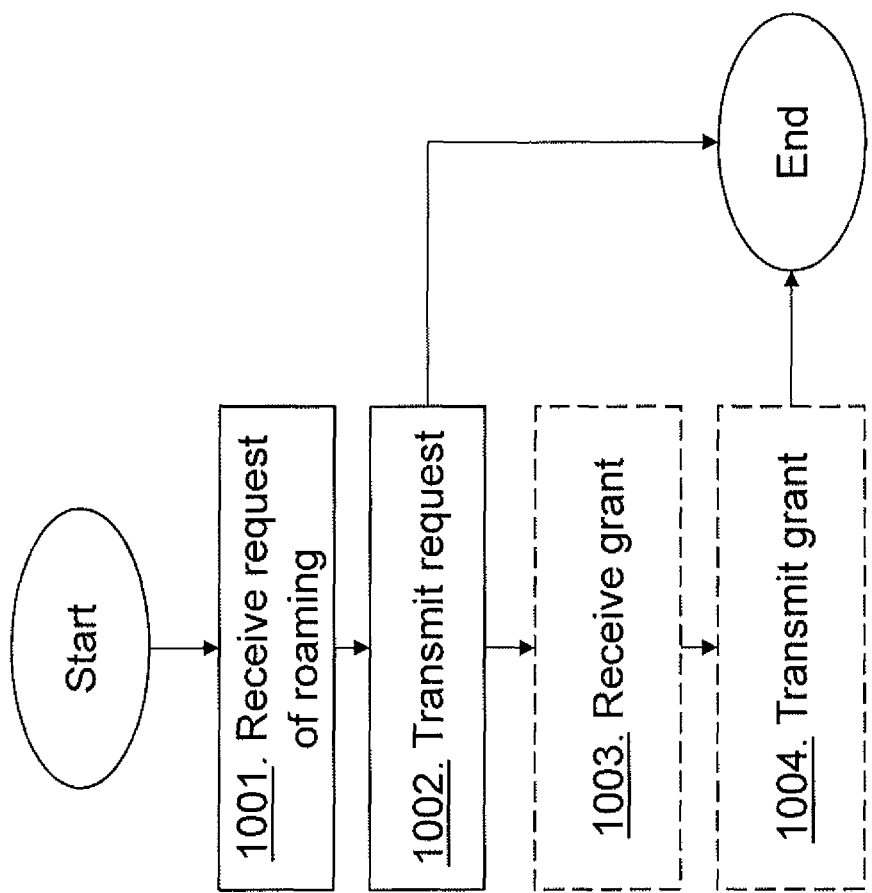
FIG. 10 is a schematic flowchart depicting a method in a second network node according to embodiments herein.

The method actions in the second network node 17, for example a PLMN managing node or similar, for enabling D2D communication between the first device 10 and the second device 13 according to some general embodiments will now be described with reference to a flowchart depicted in FIG. 10. The actions do not have to be taken in the order stated below, but may be taken in any suitable order. Actions performed in some embodiments are indicated by a dashed box. The first device 10 is served by the first PLMN comprising the first network node 16. The second device 13 is served by the second PLMN comprising the second network node 17.

Action 1001. The second network node 17 receives from the second device 13, a request for permission for the second device 13 of roaming to the first PLMN enabling the D2D communication. The request requests access to a resource controlled by the first network node 16 of the first PLMN. The request comprises an identity of the first PLMN in order to find the first PLMN, and may further comprise position related information of the second device 13 and/or the first device 10.

Action 1002. The second network node 17 transmits to the first network node 16, the request or a permission request from the second device 13 for permission for the second device 13 of roaming to the first PLMN. The permission request may as well request access to a resource controlled by the first network node 16 of the first PLMN, and may comprise position related information of the second device 13 and/or the first device 10. This action corresponds to the action 205 in FIG. 2.

Action 1003. The second network node 17 may in some embodiments receive from the first network node 16 of the first PLMN, a grant of the request. The grant may comprise at least one of a radio resource indication, position information, and maximum transmit power.

Action 1004. The second network node 17 may then transmit the grant to the second device 13. This action corresponds to the action 208 in FIG. 2.

Figure 11:
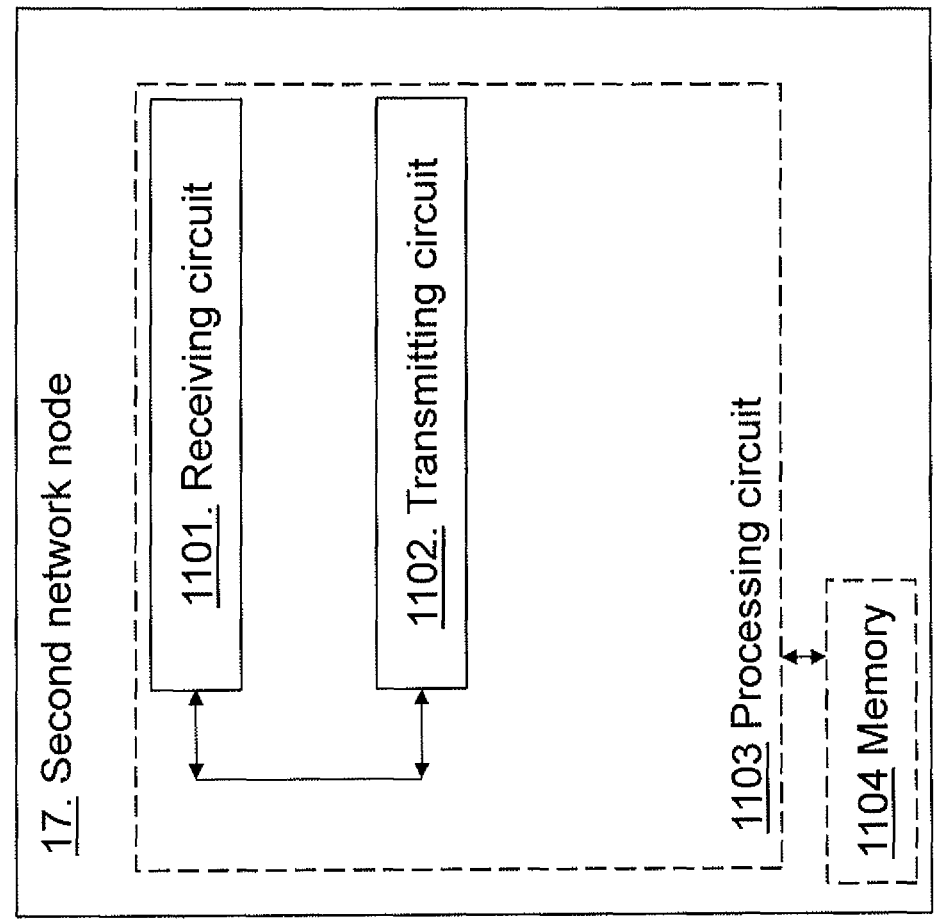
FIG. 11 is a block diagram depicting a second network node according to embodiments herein.
Figure 11:
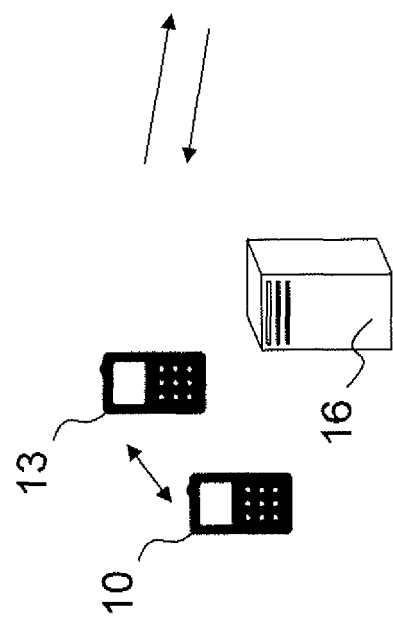

FIG. 11 is a block diagram depicting the second network node 17 according to embodiments herein for enabling D2D communication between the first device 10 and the second device 13. The first device 10 is configured to be served by the first PLMN comprising the first network node 16. The second device 13 is configured to be served by the second PLMN comprising the second network node 17.

The second network node 17 comprises a receiving circuit 1101 configured to receive from the second device 13, a request for permission for the second device 13 of roaming to the first PLMN enabling the D2D communication. The request requests access to a resource controlled by the first network node 16 of the first PLMN. The request comprises an identity of the first PLMN and may comprise the position related information of the second device 13 and/or the first device 10. The receiving circuit 1101 may further be configured to receive from the first network node 16 of the first PLMN, a grant of the request. The grant may comprise at least one of a radio resource indication, position information, and maximum transmit power.

The second network node 17 further comprises a transmitting circuit 1102 configured to transmit to the first network node 16, the request or a permission request, from the second device 13, for permission for the second device 13 of roaming to the first PLMN. The permission request requests access to a resource controlled by the first network node 16 of the first PLMN. The request may comprise the position related information of the second device 13 and/or the first device 10. In some embodiments the transmitting circuit 1102 is further configured to transmit the grant to the second device 13.

The embodiments herein for enabling D2D communications may be implemented through one or more processors, such as a processing circuit 1103 in the second network node 17 depicted in FIG. 11, together with computer program code for performing the functions and/or method actions of the embodiments herein. The program code mentioned above may also be provided as a computer program product, for instance in the form of a data carrier carrying computer program code for performing embodiments herein when being loaded into the second network node 17. One such carrier may be in the form of a CD ROM disc. It is however feasible with other data carriers such as a memory stick. The computer program code may furthermore be provided as pure program code on a server and downloaded to the second network node 17.

The second network node 17 may further comprise a memory 1104 comprising one or more memory units and may be used to store for example data such as identities, positions, limitations, application to perform the methods herein when being executed on the second network node 17, and/or similar.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments herein being defined by the following claims.

The invention claimed is:

1. A method in a first network node for enabling device to device (D2D) communication between a first device and a second device, the first device being served by a first public land mobile network comprising the first network node and the second device being served by a second public land mobile network, the method comprising:
receiving from the second device, via the second public land mobile network, or from the first device, a request for permission for the second device of roaming to the first public land mobile network enabling the D2D communication, wherein the request requests access to a resource controlled by the first network node of the first public land mobile network;
deciding whether to grant the request based on a position related information of the second device and/or the first device; and
transmitting to the first device or the second device, via the second public land mobile network, a grant of the received request when decided to grant the request, wherein the grant comprises indication of at least one of: selected radio resource, position information and maximum transmit power.

2. A method according to claim 1, wherein the deciding further comprises to select a subset of radio resources, uplink or downlink resources, to be allocated for the D2D communication, based on the position related information of the second device and/or the first device.

3. A method according to claim 1, wherein the deciding is further based on load, time of day, and/or service indicator.

4. A method according to claim 1, wherein the request comprises the position related information of the second device and/or the first device.

5. A method in a second device for enabling device to device, (D2D) communication with a first device, the first device being served by a first public land mobile network and the second device being served by a second public land mobile network, comprising;

transmitting to a first network node of the first public land mobile network, via the second public land mobile network, a request for permission for the second device of roaming to the first public land mobile network enabling the D2D communication, wherein the request requests access to a resource controlled by the first network node of the first public land mobile network, and wherein the request comprises an identity of the first public land mobile network;

receiving from the first network node, via the second public land mobile network or the first device, a grant of the request, wherein the grant comprises at least one of: selected radio resource, position information and maximum transmit power.

6. A method according to claim 5, further comprising setting up a D2D connection to the first device based on the received grant, thereby performing roaming to the first public land mobile network.

7. A method according to claim 5, further comprising discovering the first device;
exchanging data with the first device, wherein the data comprises at least identities of the public land mobile networks and identities of the first and second devices; and
determining which public land mobile network to use out of the first public land mobile network and the second public land mobile network.

8. A method according to claim 5, wherein the request comprises the position related information of the second device and/or the first device.

9. A method in a first device for enabling device to device (D2D) communication with a second device, the first device being served by a first public land mobile network comprising a first network node and the second device being served by a second public land mobile network, the method comprising:
discovering the second device;
exchanging data with the second device, wherein the data comprises at least identities of the public land mobile networks and identities of the first and second devices;
determining which public land mobile network to use out of the first public land mobile network and the second public land mobile network;
transmitting to the first network node of the first public land mobile network, a request for permission, for the second device, of roaming to the first public land mobile network enabling the D2D communication, wherein the request requests access to a resource controlled by the first network node of the first public land mobile network; and
receiving from the first network node of the first public land mobile network, a grant of the request, wherein the grant comprises at least one of: a radio resource indication, position information and maximum transmit power.

10. A method according to claim 9, further comprising transmitting the grant to the second device, directly, via the first public land mobile network, or via the second public land mobile network, to set up a D2D connection to the second device.

11. A method in a second network node for enabling device to device (D2D) communication between a first device and a second device, the first device being served by a first public land mobile network comprising a first network node and the second device being served by a second public land mobile network comprising the second network node, comprising:

receiving from the second device, a request for permission for the second device of roaming to the first public land mobile network enabling the D2D communication, wherein the request requests access to a resource controlled by the first network node of the first public land mobile network, and wherein the request comprises an identity of the first public land mobile network;

transmitting to the first network node, the request or a permission request, from the second device, for permission for the second device of roaming to the first public land mobile network, wherein the permission request requests access to a resource controlled by the first network node of the first public land mobile network; and receiving from the first network node of the first public land mobile network, a grant of the request, wherein the grant comprises at least one of a radio resource indication, position information, and maximum transmit power.

12. A method according to claim 11, further comprising transmitting the grant to the second device.

13. A first network node for enabling device to device (D2D) communication between a first device and a second device, the first device being configured to be served by a first public land mobile network comprising the first network node and the second device being configured to be served by a second public land mobile network, comprising:
a receiving circuit configured to receive, from the second device, via the second public land mobile network, or from the first device, a request for permission for the second device of roaming to the first public land mobile network enabling the D2D communication, wherein the request requests access to a resource controlled by the first network node of the first public land mobile network;
a deciding circuit configured to decide whether to grant the request based on a position related information of the second device and/or the first device; and
a transmitting circuit configured to transmit to the first device or the second device, via the second public land mobile network, a grant of the received request when decided to grant the request, wherein the grant comprises indication of at least one of: selected radio resource, position information and maximum transmit power.

14. A first network node according to claim 13, wherein the deciding circuit is further configured to select a subset of radio resources, uplink or downlink resources, to be allocated for the D2D communication, based on the position related information of the second device and/or the first device.

15. A first network node according to claim 13, wherein the deciding circuit is further configured to decide based on load, time of day, and/or service indicator.

16. A second device for enabling device to device (D2D) communication with a first device, the first device being configured to be served by a first public land mobile network and the second device being configured to be served by a second public land mobile network, comprising;
a transmitter configured to transmit to a first network node of the first public land mobile network, via the second public land mobile network, a request for permission for the second device of roaming to the first public land mobile network enabling the D2D communication, wherein the request requests access to a resource controlled by the first network node of the first public land mobile network, and wherein the request comprises an identity of the first public land mobile network; and a receiver configured to receive from the first network node, via the second public land mobile network or the first device, a grant of the request, wherein the grant comprises at least one of: selected radio resource, position information and maximum transmit power.

17. A second device according to claim 16, further comprising a setting up circuit configured to set up a D2D connection to the first device based on the received grant, thereby performing roaming of the second device to the first public land mobile network.

18. A second device according to claim 16, further comprising a discovering circuit configured to discover the first device;

an exchanging circuit configured to exchange data with the first device, wherein the data comprises at least identities of the public land mobile networks and identities of the first and second devices; and a determining circuit configured to determine which public land mobile network to use out of the first public land mobile network and the second public land mobile network.

* * * * *